(12) United States Patent
Kokusho

(10) Patent No.: US 8,382,355 B2
(45) Date of Patent: Feb. 26, 2013

(54) PLANAR LIGHT SOURCE DEVICE AND DISPLAY APPARATUS

(75) Inventor: Takafumi Kokusho, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 13/070,129

(22) Filed: Mar. 23, 2011

(65) Prior Publication Data
US 2011/0305038 A1 Dec. 15, 2011

(30) Foreign Application Priority Data

Jun. 11, 2010 (JP) ................... 2010-134083

(51) Int. Cl.
*F21V 7/04* (2006.01)
(52) U.S. Cl. ........................ 362/608; 362/621
(58) Field of Classification Search .......... 362/608–612, 362/615, 621, 625, 628
See application file for complete search history.

(56) References Cited

U.S. PATENT DOCUMENTS

| | | | | |
|---|---|---|---|---|
| 6,139,163 | A * | 10/2000 | Satoh et al. | 362/612 |
| 7,182,499 | B2 * | 2/2007 | Chen et al. | 362/621 |
| 7,563,012 | B2 * | 7/2009 | Parker | 362/612 |
| 2004/0252482 | A1 * | 12/2004 | Tsai | 362/31 |
| 2007/0121340 | A1 * | 5/2007 | Hoshi | 362/600 |
| 2007/0230215 | A1 * | 10/2007 | Chang | 362/613 |
| 2008/0100771 | A1 * | 5/2008 | Ableitner | 349/61 |
| 2008/0137335 | A1 * | 6/2008 | Tsai et al. | 362/247 |
| 2008/0137369 | A1 * | 6/2008 | Suzuki et al. | 362/612 |
| 2008/0170415 | A1 * | 7/2008 | Han et al. | 362/612 |
| 2008/0259641 | A1 * | 10/2008 | Suzuki et al. | 362/612 |

FOREIGN PATENT DOCUMENTS

| | | |
|---|---|---|
| JP | 62-176889 | 11/1987 |
| JP | 10-82915 | 3/1998 |

OTHER PUBLICATIONS

U.S. Appl. No. 13/349,749, filed Jan. 13, 2012, Kokusho.

* cited by examiner

*Primary Examiner* — Julie Shallenberger
(74) *Attorney, Agent, or Firm* — Oblon, Spivak, McClelland, Maier & Neustadt, L.L.P.

(57) ABSTRACT

A planar light source device including: a point light source; and a light guide plate, wherein the light guide plate includes: an emitting surface; an opposite emitting surface; and a side surface that connects the emitting surface and the opposite emitting surface; wherein the point light source is arranged adjacent to the side surface of the light guide plate, wherein the light guide plate has a cylindrical hole that is formed at a position, which corresponds to the position where the point light source is arranged, and wherein the hole forms an opening at the side surface to emit a portion of the light to the outside of the light guide plate, the portion of the light is emitted by the point light source and the portion of the light being a portion that was not totally reflected at the side surface.

9 Claims, 4 Drawing Sheets

PLANAR LIGHT SOURCE DEVICE AND DISPLAY APPARATUS

CROSS-REFERENCE TO RELATED APPLICATION

This application claims priority from Japanese Patent Application No. 2010-134083 filed on Jun. 11, 2010, the entire subject matter of which is incorporated herein by reference.

BACKGROUND

1. Technical Field

The present invention relates to a planar light source device that uses a point light source and a display apparatus using the planar light source.

2. Background

In a general planar light source device using a point light source, a point light source is arranged in a recess part provided on a bottom surface of a light guide plate, and light spreads into the light guide plate (refer to JP-A-10-82915 or JP-UM-A-62-176889).

SUMMARY

According to a planar light source device disclosed in JP-A-10-82915, a point light source is arranged at a center of a light guide plate, and light of the point light source spread into the light guide plate. Then, planar light is emitted from an emitting surface of the light guide plate. However, the emitting surface adjacent to the point light sources is brightened due to the light, which does not spread into the light guide plate and is emitted from the emitting surface adjacent to the point light source, may be caused. Thus, a difference of brightness may be caused. In order to prevent the difference of brightness, a method of using a light diffusion member and the like is acquired.

According to a display apparatus of JP-UM-A-62-176889, a substantially semicircular light incident part is formed at an end portion of a side surface of a light guide plate. A point light source is arranged there and the light spreads into the light guide plate. However, since the light that does not enter into the light guide plate is much present in a case of the light entering part disclosed in JP-UM-A-62-176889, the light usage efficiency is lowered.

The present invention is made with consideration of the above problem. An object of the present invention is to provide a planar light source device that effectively spreads light emitted from a point light source in a light guide plate and a display apparatus using the same.

A planar light source device of the present invention includes a point light source; and a light guide plate that spreads out light emitted from the point light source, wherein the light guide plate includes: an emitting surface from which the light is emitted; an opposite emitting surface that is a surface opposite to the emitting surface; and a side surface that connects the emitting surface and the opposite emitting surface; wherein the point light source is arranged adjacent to the side surface of the light guide plate and is arranged at the opposite emitting surface side of the light guide plate, wherein the light guide plate has a cylindrical hole that is formed at a position, which corresponds to the position where the point light source is arranged, and wherein the hole forms an opening at the side surface to emit a portion of the light to the outside of the light guide plate, the portion of the light is emitted by the point light source and the portion of the light being a portion that was not totally reflected at the side surface.

According to the present invention, since the light emitted from the point light source effectively spreads into the light guide plate, it is possible to achieve a planar light source device having high light usage efficiency.

DESCRIPTION OF PREFERRED ILLUSTRATIVE ASPECTS

First Illustrative Aspect
<Configuration of Planar Light Source Device>

Figure 1:
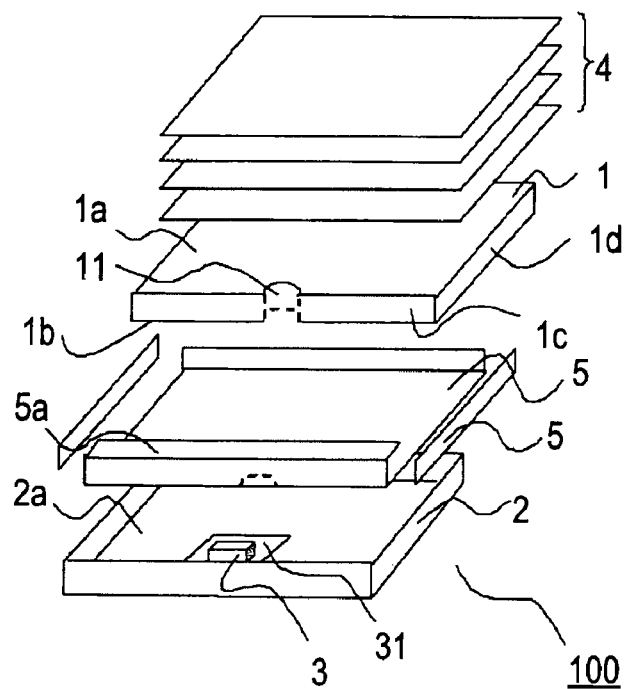
FIG. 1 is an exploded perspective view of a planar light source device according to an illustrative aspect of the present invention.

FIG. 1 is an exploded perspective view showing a planar light source device according to a first illustrative aspect of the present invention. In FIG. 1, a planar light source device 100 of this illustrative aspect has a light guide plate 1 that spreads out light in a planar shape and emits the light from an emitting surface 1a. The light guide plate 1 is arranged in a frame 2 having an opening 2a and emits light in a direction of the opening 2a, which direction is an emitting direction. The light guide plate 1 has not only the emitting surface 1a from which light is emitted, but also an opposite emitting surface 1b that is an opposite surface to the emitting surface 1a and side surfaces that are substantially perpendicular to the emitting surface 1a and the opposite emitting surface 1b and connect the emitting surface 1a and the opposite emitting surface 1b. In the meantime, as shown in FIG. 1, the light guide plate 1 that is used in this illustrative aspect has a rectangular flat plate shape when seen from a plan view and has a pair of first side surfaces 1c opposite to each other and a pair of second side surfaces 1d opposite to each other. A point light source 3 that emits light is arranged to face the opposite emitting surface 1b of the light guide plate 1 and is arranged adjacent to at least one of the first side surfaces 1c. In the meantime, a hole 11 is formed at an end portion of the first side surface 1c in correspondence to the position, where the point light source 3 is arranged, of the light guide plate 1. In addition, optical sheets 4 such as lens sheets and diffusion sheets diffusing light are arranged on the emitting surface 1a of the light guide plate 1. Additionally, reflective sheets 5 are arranged on the opposite emitting surface 1b, the first side surfaces 1c and the second side surfaces 1d of the light guide plate 1. At the emitting surface 1a including the hole 11, an upper part 5a of the reflective sheet 5 is arranged so that it covers the hole 11.

<Reflective Sheet>

The reflective sheet 5 is made of a material having polyethylene or polyethylene terephthalate mixed with barium sulfate or titanium oxide, a resin material having fine bubbles formed therein, a material of a metal plate having vapor-deposited silver thereon or a material of a metal plate applied pigments containing titanium oxide. In the meantime, a reflectivity of the reflective sheet 5 is preferably 90 percent or greater in order to suppress reflection loss on a reflective surface. Accordingly, a mirror-reflective material may be used. By arranging the reflective sheets 5, the light emitted from the light guide plate 1 is again directed toward the light guide plate 1, so that the light usage efficiency can be improved.

<Frame>

When a white material is used for a frame 2, the reflectivity can be further improved and the light loss is suppressed, so that it is possible to improve the light usage efficiency of the planar light source device 100.

<Optical Sheet>

The optical sheets 4 that are arranged on the emitting surface 1a of the light guide plate 1 may be configured by combining a lens sheet, a diffusion sheet and the like. In addition, a structure in which the lens sheet is sandwiched between the diffusion sheets may be used. Additionally, a plurality of lens sheets in which prism directions are optimally combined may be used in order to improve luminance. Further, two or more diffusion sheets may be used in order to improve diffusivity of the diffusion sheets. Only one diffusion sheet or no diffusion sheet may be used. Moreover, a protecting sheet, a viewing angle controlling sheet and a polarizing reflective sheet may be used as the optical sheet 4. In other words, the optical sheets 4 are combined and configured according to required luminance and light distribution characteristics.

<Point Light Source>

The point light source 3 is configured by a light emitting diode (LED), a laser diode (LD) and the like. In this illustrative aspect, the LED mounted on a light source substrate 31 is used as the point light source 3. The LED includes a semiconductor light emitting device that emits monochromic light of blue, etc., a pseudo-white LED, which is made of a fluorescent substance that absorbs a part of the blue monochromic light emitted from the semiconductor light emitting device and emits yellow light, and the like. In addition, there is an LED that combines the semiconductor light emitting devices of RED (R), GREEN (G) and BLUE (B) to mix the three monochromic light, thereby acquiring white light. In this illustrative aspect, the pseudo-white LED is used. In some cases, the monochromic light LED may be used. Further, although one point light source 3 is shown in FIG. 1, a plurality of point light sources 3 may be also used. In the present invention, the LED may be used as the point light source 3 and arranged in the hole 11 of the light guide plate 1. By this configuration, it is possible to spread the light emitted from the LED radially or concentrically, so that it is possible to achieve a planar light source device having high light usage efficiency. Accordingly, even when the number of LEDs is small, it is possible to achieve the desired luminance and to improve uniformity of the luminance. In addition, it is possible to configure the planar light source device with the few point light sources 3, which contributes to the low cost and the lightweight.

<Light Source Substrate>

The light source substrate 31 holds the point light source 3 and forms a circuit pattern (not shown) to supply power to the point light source 3. In addition, a metal plate is used as the light source substrate 31, so that it is possible to effectively diffuse heat generated from the point light source 3 to the environment and to improve the light emitting efficiency of the point light source 3. Additionally, the point light source 3 may be mounted on a flexible printed circuit (FPC), so that it is possible to transfer the heat generated from the point light source 3 to the environment and possible to receive the substrate without increasing a volume of the planar light source device 100.

<Display Device>

A display device (not shown) is arranged on the planar light source device 100, so that a display apparatus is configured. As the display device, a liquid crystal display panel that uses birefringence of a liquid crystal material, a display panel having a transparent plate on which a letter or picture is printed, and the like, are used. The liquid crystal display panel is configured by a color filter substrate, which includes a color filter, a light shielding layer, an opposite electrode and the like, and a thin film transistor (TFT) substrate, which includes a TFT serving as a switching device, a pixel electrode and the like, opposite to the color filter substrate. The liquid crystal display panel has: a spacer for maintaining a distance between both substrates; a seal material for adhering the color filter substrate and the TFT substrate; a liquid crystal material sandwiched between the color filter substrate and the TFT substrate; an oriented film that orients the liquid crystal; and a polarization plate. The liquid crystal display panel controls the orientation of the liquid crystal layer by changing the voltage between on and off by using the switching device and modulates the light, which is entered into the liquid crystal display panel, corresponding to an image signal. Thus, a display operation is performed.

<Light Guide Plate>

In this illustrative aspect, a flat plate having a uniform thickness is used as the light guide plate 1. However, a wedge-shaped light guide plate 1 may be used. The light guide plate is made of transparent acryl resin, polycarbonate resin, glass and the like. In addition, the opposite emitting surface 1b of the light guide plate 1 is formed with a light diffusion part (not shown), which diffuses a propagating directions of the light and guides the light in an emitting direction, along which the light is emitted from the emitting surface 1a. The light scattering part serves as means for reflecting the light toward the inside of the light guide plate 1. The reflecting means may be formed by a method of printing dots on the opposite emitting surface 1b, a method of roughening the opposite emitting surface 1b to form an embossing surface, a method of forming a fine spherical surface or uneven surface and the like.

Figure 2:
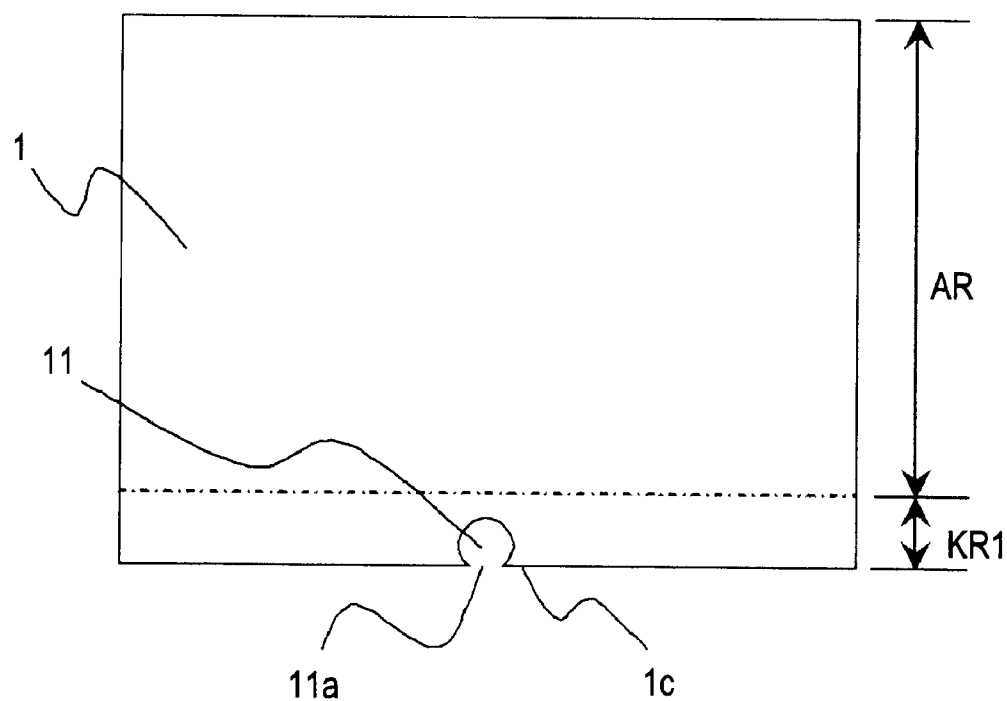
FIG. 2 is a top view of a light guide plate that is used in an illustrative aspect of the present invention.
Figure 3:
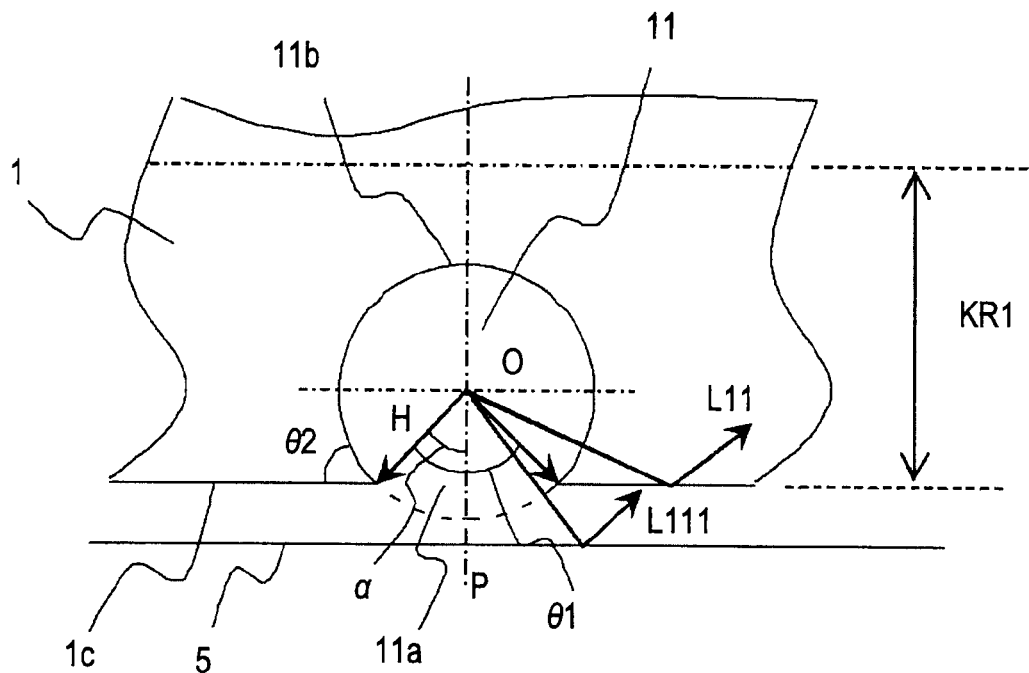
FIG. 3 is an enlarged view of a portion of the light guide plate shown in FIG. 2.

FIG. 2 is a top view of the light guide plate 1 and FIG. 3 is an enlarged view of a portion of the light guide plate 1 shown in FIG. 2. As shown in FIGS. 2 and 3, the light guide plate 1 of this illustrative aspect has the hole 11 in a light source arrangement area KR1 at the end portion of the first side surface 1c, which is formed at a position corresponding to the point light source 3 (not shown) arranged at the opposite emitting surface 1b of the light guide plate 1. In the meantime, an emitting area AR is arranged adjacent to the light source arrangement area KR1 and the light scattering part is formed in the emitting area AR. In addition, the hole 11 of the first illustrative aspect is formed to penetrate between the emitting surface 1a and the opposite emitting surface 1b of the light guide plate 1 and has a cylinder shape whose shapes at the emitting surface 1a and the opposite emitting surface 1b are same. Also, the emitting surface 1a and the opposite emitting surface 1b have a shape such that a part of a circle, an ellipse, a long circle and a polygon is cut off. In other words, the hole 11 has a circular cylinder shape (elliptical cylinder, long circle cylinder) or rectangular cylinder shape and has an opening 11a at a side portion 11b of the cylinder shape, which is opened at a side of the first side surface 1c.

Figure 4:
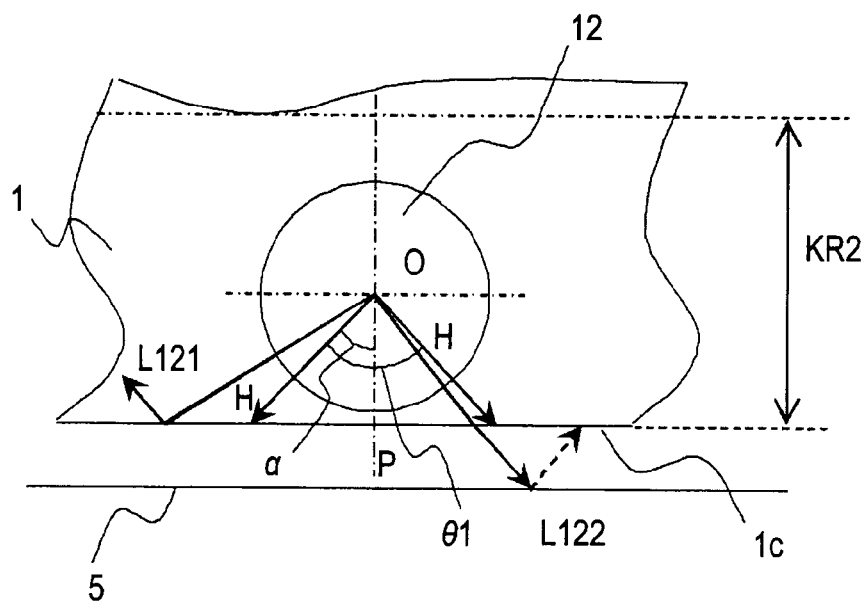
FIG. 4 shows a comparative example of a different light guide plate.

Next, the opening 11a of the hole 11, which is formed at the first side surface 1c of the light guide plate 1, will be described. FIG. 4 shows a comparative example of a different light guide plate. As shown in FIG. 4, a hole 12 having a cylinder shape is formed at a position corresponding to the point light source 3 (not shown) and is provided in a light source arrangement area KR2 that is an end portion of the first side surface 1c. Herein, a line P illustrates a vertical line extending from a center O of the hole 12 (a light emitting center of the point light source 3) in a direction perpendicular to the first side surface 1c, a arrow H illustrates a trajectory of the light directing toward the first side surface 1c, and an angle α illustrate a angle formed between the vertical line P and the trajectory of light H. The angle α becomes a critical angle, when the light emitted from the point light source 3 reaches the first side surface 1c and the light is totally reflected at the first side surface 1c. The critical angle α is corresponding to a refractive index n of the material of the light guide plate 1 and is expressed by a following equation 1, $$\alpha = \arcsin(1/n).$$  Equation 1:

When light having an angle greater than the critical angle α expressed in the equation 1 reaches the first side surface 1c, the light is totally reflected and spreads. Accordingly, light L121 having an angle α greater than the critical angle is totally reflected at the first side surface 1c and spreads into the light guide plate 1. On the other hand, light L122 having an angle α smaller than the critical angle and directed toward the first side surface 1c is not totally reflected at the first side surface 1c, and the light is emitted to the outside of the light guide plate 1. The light L122 emitted to the outside of the light guide plate 1 is again directed toward the light guide plate 1 by the reflective sheet 5 that is arranged at the position opposite to the first side surface 1c. However, since the light L122 is reused after being emitted to the outside of the light guide plate 1, the light loss is caused. A range of a central angle θ1 of the hole 12, which corresponds the light L122 having an angle α that is smaller than the critical angle, is expressed by a following equation 2, $$\theta 1 < 2\alpha.$$  Equation 2:

Accordingly, as shown in FIG. 3, the end portion of the first side surface 1c is formed with the opening 11a having the side portion 11b of the hole 11, which is formed in a range within which the light is not totally reflected when light having a central angle θ1 and directed toward the first side surface 1c reaches the first side surface 1c. In other words, when the hole 11 has a circular cylinder shape, a circular arc (side portion 1b) having a central angle within θ1 is arranged at the first side surface 1c to form the opening 11a. For example, when the light guide plate 1 is made of acryl having a refractive index n of 1.49, the critical angle α becomes 42.16 degrees basis of the equation 1 and the equation 2, and the central angle θ1 is 84.32 degrees or smaller. Therefore, a circular arc (side portion) in which the central angle θ1 of the hole 11 is 84.32 degrees is arranged at the first side surface 1c to form the opening 11a.

Next, the operations of the planar light source device of this illustrative aspect will be described. As shown in FIG. 3, among the light emitted from the point light source 3 and emitted into the side portion 11b of the hole 11, the light L11 directed toward the first side surface 1c reaches the first side surface 1c with an angle greater than the critical angle. Accordingly, the light is totally reflected at the first side surface 1c without light loss and spreads into the light guide plate 1. On the other hand, the light L111 is directed toward the first side surface 1c with an angle smaller than the critical angle is not entered into the side portion 11b of the hole 11, the light L111 is emitted from the opening 11a to the outside of the light guide plate 1 and again enters the first side surface 1c of the light guide plate 1 by reflecting from the reflective sheet 5 opposite to the first side surface 1c of the light guide plate 1. Thus, the light L111 spreads into the light guide plate 1. The light that spreads into the light guide plate 1 is diffused by the printed dots, roughened surface or prism, etc., that is provided on the opposite emitting surface 1b of the light guide plate 1, so that the spreading direction of the light is changed. Thus, an angle of the light is smaller than the critical angle at an interface between the light guide plate 1 and the air surrounding the light guide plate 1. As a result, the light is emitted from the emitting surface 1a of the light guide plate 1. In the meantime, the light directed toward a direction other than the first side surface 1c is radially diffused and spread in the light guide plate 1.

As described above, according to the planar light source device 100 of this illustrative aspect, among the light emitted from the point light source 3, the light having an angle that is smaller than the critical angle at the first side surface 1c is emitted from the opening 11a to the outside of the light guide plate 1 without passing through the light guide plate 1, the light reaches the reflective sheet 5 opposite to the first side surface 1c, and then the light is directed toward the light guide plate 1. On the other hand, the light having an angle that is greater than the critical angle at the first side surface 1c is totally reflected at the first side surface 1c and spread in the light guide plate 1. Accordingly, when the point light source 1 is arranged adjacent to the first side surface 1c of the light guide plate 1, it is possible to effectively spread out the light emitted from the point light source 3 into the light guide plate 1 and thus achieves a planar light source device having high light usage efficiency. In addition, since the opening 11a of the hole 11 is formed at the first side surface 1c of the light guide plate 1, it is possible to narrow the light source arrangement area KR1 of the point light source 3, compared to the comparative light source arrangement area KR2 shown in FIG. 4. As a result, it is possible to achieve a planar light source device having a narrow frame.

In the meantime, the side portion 11b of the hole 11 of the light guide plate 1 may be configured by either a mirror surface having no unevenness or an uneven roughened surface. When the side portion is configured by a mirror surface being even, it is possible to effectively introduce the light into the light guide plate. On the other hand, when the side portion is configured by an uneven roughened surface, it is possible to diffuse the light adjacent to the light source and possible to uniformize the luminance in the light guide plate 1.

The hole 11 of the light guide plate 1 may be formed by a recess portion (not shown) that is only opened at the opposite emitting surface 1b without penetrating between the emitting surface 1a and the opposite emitting surface 1b of the light guide plate 1. In the illustrative aspect, the hole 11 is formed at the position corresponding to the position where the point light source 3 is arranged. However, the point light source 3 may be received in the hole.

In addition, a reflecting part may be provided at the emitting surface 1a of the hole 11 (not shown). By this configuration, since it is possible to reflect the light, which is emitted from the point light source 3 toward the emitting surface 1a, in the hole 11 and possible to spread the light in the light guide plate 11. Thus, it is possible to improve the light usage efficiency. The reflecting part may be formed by arranging a reflective sheet or using a white material for the frame 2.

Moreover, in the planar light source device 100 of this illustrative aspect, a mirror-surface processing, a roughening processing, a dot-pattern printing or a colored printing may be performed on the emitting surface 1a or opposite emitting surface 1b of the light guide plate 1 (not shown). For example, by roughening the emitting surface 1a or the opposite emitting surface 1b of the light guide plate 1 and thus forming an embossing surface, it is possible to uniformize the luminance on the emitting surface 1a of the light guide plate 1.

Second Illustrative Aspect

Figure 5:
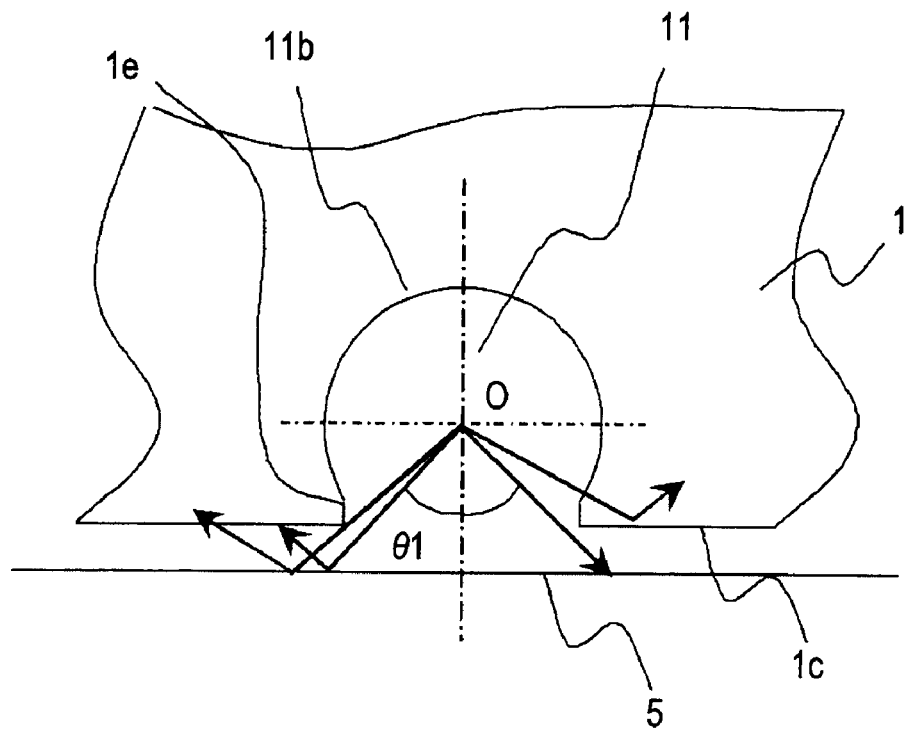
FIG. 5 is an enlarged view of a portion of a light guide plate according to an illustrative aspect of the present invention.
Figure 6:
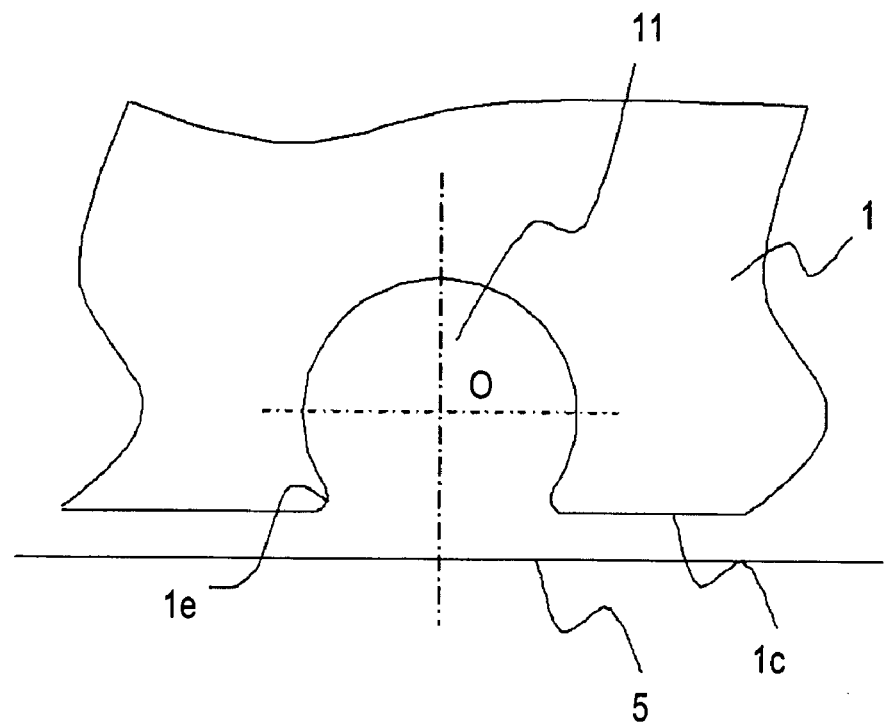
FIG. 6 is an enlarged view of a portion of a light guide plate according to an illustrative aspect of the present invention.

A planar light source device of a second illustrative aspect will be described. FIGS. 5 and 6 are enlarged views of a portion of a light guide plate according to a second illustrative aspect. Except for specific configurations and operations of the planar light source device of the second illustrative aspect, the planar light source device of this illustrative aspect is the same as the planar light source device of the first illustrative aspect, so that the repetitive descriptions will be omitted.

As shown in FIG. 3, in the hole 11 of the first illustrative aspect, an angle θ2 between the side portion 11b of the hole 11 of the light guide plate 1 and the first side surface 1c forms an acute angle. Thus, the hole may be damaged when other members and the like are contacted to the hole or it is difficult to form the light guide plate 1. According to the second illustrative aspect, as shown in FIGS. 5 and 6, a connection portion 1e between the side portion 11b of the hole 11 of the light guide plate 1 and the first side surface 1c is formed to be a planar or curved face. By this configuration, even when the opening 11 is formed at the end portion of the first side surface 1c of the light guide plate 1, the hole may be little damaged or it is easy to form the light guide plate 1 and possible to make a mold of the light guide plate 1. In the meantime, although the first side surface 1c is cut off by forming the connection portion 1e, the light emitted from the point light source 3 is emitted to the outside of the light guide plate 1 without passing through the light guide plate 1, and then the light is again entered into the light guide plate 1 by the reflective sheet 5. Accordingly, the light spreading efficiency in the light guide plate 1 by the total reflection is little affected.

Figure 7:
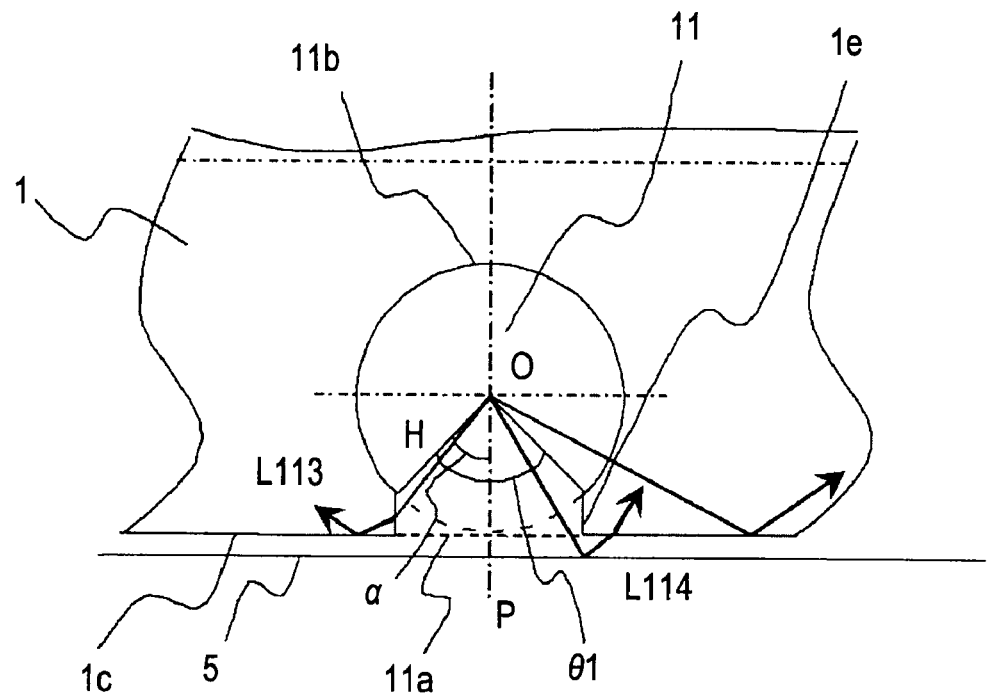
FIG. 7 is an enlarged view of a portion of a light guide plate according to an illustrative aspect of the present invention.

In addition, as shown in FIG. 7, the hole 11 formed at the light guide plate 1 may be formed at the first side surface 1c and the opening 11a may be formed at the first side surface 1c by the connection portion 1e between the first side surface 1c and the side portion 11b of the hole 11. In the meantime, the connection portion 1e is formed, as described above, as a plane perpendicular to the first side surface 1c from the side portion 11b of the hole 11 so that the opening 11a is formed within the range of the central angle θ1 of the hole 11. By this configuration, among the light emitted from the center O of the point light source 3 and directed toward the first side surface 1c, light L113 entered into the connection portion 1e is refracted at the first side surface 1c, and then the light L113 enters into the light guide plate 1 and is totally reflected at the first side surface 1c and spread into the light guide plate 1. In addition, light L114 that is not entered into the connection portion 1e is emitted to the outside of the light guide plate 1, and then the light is entered into the light guide plate 1 by the reflective sheet 5.

Third Illustrative Aspect

Figure 8:
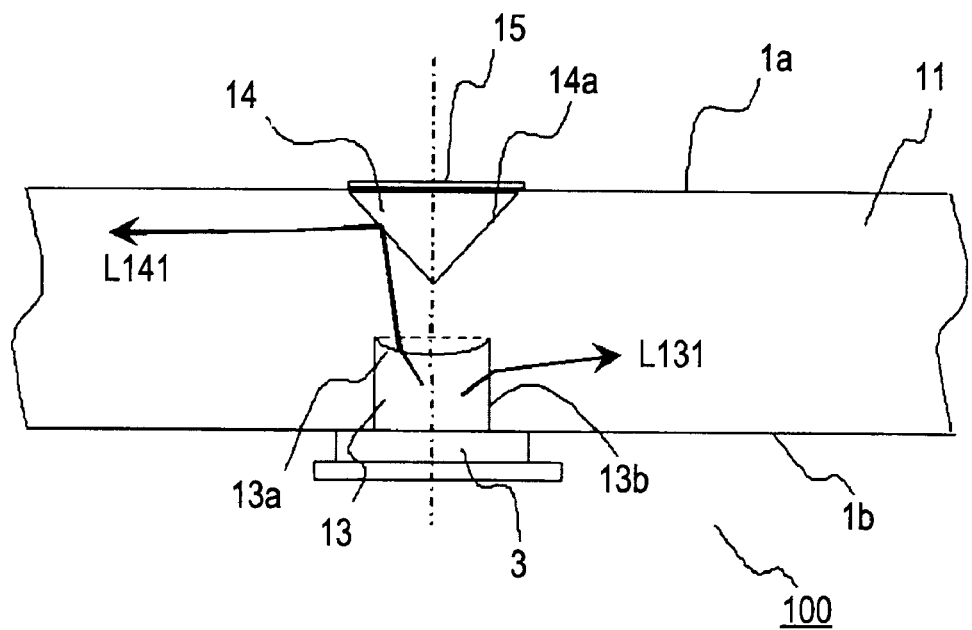
FIG. 8 is a sectional view of a planar light source device according to an illustrative aspect of the present invention.

A planar light source device of a third illustrative aspect will be described. FIG. 8 is a sectional view of a light guide plate configuring a planar light source device according to a third illustrative aspect. Since the planar light source device of this illustrative aspect is the same as the planar light source devices of the first and second illustrative aspects, except for specific configurations and operations of the planar light source device of the third illustrative aspect, the repetitive descriptions will be omitted.

In the first and second illustrative aspects, the cylindrical hole 11 is formed at the light guide plate 1. However, in the third illustrative aspect, a first recess part 13 is formed at the opposite emitting surface 1b and a second recess part 14 is formed at the emitting surface 1a in correspondence to the first recess part 13. The first recess part 13 is a cylindrical recess part and has a convex portion 13a at a bottom. The convex portion 13a of this illustrative aspect is a protrusion portion that protrudes toward the opposite emitting surface 1b. In addition, the second recess part 14 has a conical shape.

Next, operations of the third illustrative aspect will be described. In FIG. 8, among the light emitted from the point light source 3, light L131 reaching a side surface 13b of the first recess part 13 is refracted at the side surface 13b and then spread into the light guide plate 1. In addition, light L141 directed toward the convex portion 13a of the recess part 13 is concentrated on the second recess part 14 by the convex portion 13a and is reflected at a side surface 14a of the second recess part 14. Thus, the light spreads into the light guide plate 1. An slight amount of the light transmitting from the first recess part 13 to the second recess part 14 is emitted to the outside of the light guide plate 1 without being spread into the light guide plate 1. However, the light is reflected by the reflective sheet 15 provided on an upper surface of the second recess part 14 and spread into the light guide plate 1. By this configuration, among the light emitted from the point light source 3, the light having an angle that is smaller than the critical angle at the first side surface 1c of the light guide plate 1 is emitted to the outside of the light guide plate 1 from the opening without passing through the light guide plate 1, and the light reaches the reflective sheet 5 opposite to the first side surface 1c and is again directed toward the light guide plate 1. The light emitted from the point light source 3 can be spread out in a direction parallel to the emitting surface 1a of the light guide plate 1 by the first recess part 13 and the second recess part 14. As a result, it is possible to improve the uniformity of luminance. In addition, when viewed from the emitting surface 1a, it is possible to spread radially the light about the point light source 3.

Additionally, the convex portion 13a provided to the first recess part 13 may protrude toward the emitting surface 1a of the light guide plate 1 (not shown) and may configured by uneven surface.

The present invention is not limited to the above illustrative aspects. In other words, the illustrative aspects can be variously changed and combined without departing from the scope of the present invention. For example, a plurality of light sources may be arranged and the types and shapes of the light guide plate may be appropriately selected.

What is claimed is:
1. A planar light source device comprising:
a point light source; and
a light guide plate that spreads out light emitted from the point light source, wherein
the light guide plate includes:
an emitting surface from which the light is emitted;
an opposite emitting surface that is a surface opposite to the emitting surface; and
a side surface that connects the emitting surface and the opposite emitting surface;
wherein the point light source is arranged adjacent to the side surface of the light guide plate and is arranged at the opposite emitting surface side of the light guide plate, wherein the light guide plate has a cylindrical hole that is formed at a position which corresponds to the position where the point light source is arranged, and wherein the hole forms an opening at the side surface to emit a portion of the light from the point light source to the outside of the light guide plate, the opening being located relative to the point light source such that the portion of the light emitted through the hole to the outside of the light guide plate is light that would reach to the side surface and would not be totally reflected at the side surface.

2. The planar light source device according to claim 1, wherein a side portion is a portion being a side wall of the opening, wherein a connection portion is a portion between the side portion and the side surface, wherein a refractive index of a material of the light guide plate is indicated as n, wherein a light angle is defined between:

a vertical line, which extends from a light emitting center of the point light source in a direction perpendicular to the side surface, and a trajectory of light, which is directed toward the side surface, wherein, the light angle is to be a critical angle indicated as α if the light angle meets the following condition:

$\alpha = \arcsin(1/n)$, wherein a central angle is indicated as θ1 and is defined by an angle between the connection portions with respect to the light emitting center, and wherein the side portion is formed to meet the following condition:

$\theta 1 \leq 2\alpha$.

3. The planar light source device according to claim 2, wherein the connection is formed into a planar or curved face.

4. The planar light source device according to claim 1, wherein the cylindrical hole has the same shape at the emitting surface and at the opposite emitting surface, and wherein the hole penetrates between the emitting surface and the opposite emitting surface.

5. The planar light source device according to one claim 1, wherein the hole is a first recess part that is formed at the opposite emitting surface.

6. The planar light source device according to claim 5, wherein a convex portion is provided at a bottom of the first recess part.

7. The planar light source device according to claim 5, further comprising a second recess part that is formed at a position of the emitting surface, which corresponds to the first recess part.

8. The planar light source device according to claim 7, wherein the second recess part has a conical shape.

9. A display apparatus comprising:

a planar light source device comprising:

a point light source; and a light guide plate that spreads out light emitted from the point light source, wherein the light guide plate includes:

an emitting surface from which the light is emitted;

an opposite emitting surface that is a surface opposite to the emitting surface; and a side surface that connects the emitting surface and the opposite emitting surface;

wherein the point light source is arranged adjacent to the side surface of the light guide plate and is arranged at the opposite emitting surface side of the light guide plate, wherein the light guide plate has a cylindrical hole that is formed at a position which corresponds to the position where the point light source is arranged, and wherein the hole forms an opening at the side surface to emit a portion of the light from the point light source to the outside of the light guide plate, the opening being located relative to the point light source such that the portion of the light emitted through the hole to the outside of the light guide plate is light that would reach to the side surface and not be totally reflected at the side surface; and a display device which is provided opposite to the planar light source device.

* * * * *